US012403621B2

(12) United States Patent
Denney et al.

(10) Patent No.: US 12,403,621 B2
(45) Date of Patent: Sep. 2, 2025

(54) MOTORIZED SYSTEMS AND ASSOCIATED METHODS FOR CONTROLLING AN ADJUSTABLE DUMP ORIFICE ON A LIQUID JET CUTTING SYSTEM

(71) Applicant: OMAX Corporation, Kent, WA (US)

(72) Inventors: William Denney, Kent, WA (US); Erik Unangst, Kent, WA (US); Kevin Hay, Des Moines, WA (US); Ryan Boehm, Seattle, WA (US)

(73) Assignee: Hypertherm, Inc., Hanover, NH (US)

( * ) Notice: Subject to any disclaimer, the term of this patent is extended or adjusted under 35 U.S.C. 154(b) by 1176 days.

(21) Appl. No.: 17/127,736

(22) Filed: Dec. 18, 2020

(65) Prior Publication Data

US 2021/0187778 A1 Jun. 24, 2021

Related U.S. Application Data

(60) Provisional application No. 62/952,013, filed on Dec. 20, 2019.

(51) Int. Cl.
*B26F 3/00* (2006.01)
*B24C 1/00* (2006.01)

(52) U.S. Cl.
CPC ................ *B26F 3/004* (2013.01); *B24C 1/00* (2013.01)

(58) Field of Classification Search
CPC .. B24C 1/045; B24C 1/04; B24C 9/00; B24C 5/04; B24C 5/02; B24C 7/0007; B24C 7/0015; B24C 7/0023; B24C 7/0084; B24C 3/04; B24C 3/06; B26F 3/004; B26F 3/008; Y10T 83/364; Y10T 83/0591;

(Continued)

(56) References Cited

U.S. PATENT DOCUMENTS 609,752 A 8/1898 Angell
612,493 A 10/1898 Harbinger
(Continued)

FOREIGN PATENT DOCUMENTS

CN 102507171 B 12/2014
DE 202013104815 U1 3/2014
(Continued)

OTHER PUBLICATIONS

EP1477873—Machine Translation (Year: 2004).*
(Continued)

*Primary Examiner* — Brian D Keller
*Assistant Examiner* — Alberto Saenz
(74) *Attorney, Agent, or Firm* — Perkins Coie LLP

(57) ABSTRACT

Automatically controlled adjustable dump orifices (ADO) for use with liquid jet cutting systems are disclosed herein. In some embodiments, the automatically controlled ADOs described herein include a motor (e.g., an electric motor) and a coupling configured to operably couple the motor to a valve. The valve is configured to cooperate with a dump orifice connected in fluid communication with a high-pressure pump of the cutting system. The motor is operable to move the valve in a first direction to increase the pressure of high-pressure liquid (e.g., water) flowing through the dump orifice and in a second direction, opposite to the first direction, to reduce the pressure of the high-pressure liquid flowing through the dump orifice.

23 Claims, 5 Drawing Sheets

(58) Field of Classification Search

CPC ...... F16K 31/04; F16K 31/042; F16K 31/046; F16K 31/047; F16K 31/53; F16K 31/363; F16K 1/385; F16K 1/12; F16K 1/38; F16K 1/52; F16K 1/54; B24B 57/02; G05D 16/00

USPC .......... 451/2, 36, 38, 40, 75, 99, 102; 83/22, 83/53, 177; 251/122, 123, 129.04, 251/129.11, 215, 248, 266, 267, 270, 273

See application file for complete search history.

(56) References Cited

U.S. PATENT DOCUMENTS

| | | | |
|---|---|---|---|
| 711,086 | A | 10/1902 | Vivian |
| 817,058 | A | 4/1906 | Greenfield |
| 1,066,711 | A | 7/1913 | Cook |
| 1,329,762 | A | 2/1920 | Guy |
| 1,391,009 | A | 9/1921 | Eugene |
| 1,725,836 | A | 8/1929 | Solberg |
| 1,847,147 | A | 3/1932 | Thomas, Jr. |
| 2,007,501 | A | 7/1935 | William |
| 2,359,352 | A | 10/1944 | Bucknam et al. |
| 2,483,803 | A | 10/1949 | Bridgman et al. |
| 2,528,280 | A | 10/1950 | Lyon |
| 2,558,035 | A | 6/1951 | Bridgman |
| 2,679,411 | A | 5/1954 | Moore |
| 2,715,958 | A | 8/1955 | Lindstrom et al. |
| 2,788,994 | A | 4/1957 | Van De Wateren |
| 2,836,443 | A | 5/1958 | Farmer |
| 2,935,365 | A | 5/1960 | Dega |
| 2,957,712 | A | 10/1960 | Farmer |
| 2,999,552 | A | 9/1961 | Fox |
| 3,068,017 | A | 12/1962 | Prosser |
| 3,232,638 | A | 2/1966 | Bernard |
| 3,267,718 | A | 8/1966 | Grube |
| 3,454,288 | A | 7/1969 | Mancusi |
| 3,455,566 | A | 7/1969 | Hull et al. |
| 3,517,701 | A | 6/1970 | Smith |
| 3,540,741 | A | 11/1970 | Lefebvre |
| 3,705,693 | A | 12/1972 | Franz |
| 3,711,633 | A | 1/1973 | Ghirardi et al. |
| 3,834,912 | A | 9/1974 | Grudzinski |
| 3,851,899 | A | 12/1974 | Franz |
| 3,907,307 | A | 9/1975 | Maurer et al. |
| 3,997,111 | A | 12/1976 | Thomas et al. |
| 4,026,322 | A | 5/1977 | Thomas |
| 4,081,892 | A | 4/1978 | Mercer |
| 4,089,199 | A | 5/1978 | Siemonsen |
| 4,134,430 | A | 1/1979 | Mukasa et al. |
| 4,195,669 | A | 4/1980 | Ives et al. |
| 4,261,769 | A | 4/1981 | Usui |
| 4,272,108 | A | 6/1981 | Maasberg |
| 4,306,728 | A | 12/1981 | Huperz et al. |
| 4,339,897 | A | 7/1982 | Thompson et al. |
| 4,371,001 | A | 2/1983 | Olsen |
| 4,392,655 | A | 7/1983 | Olsen et al. |
| 4,417,459 | A | 11/1983 | Tomita |
| 4,435,902 | A | 3/1984 | Mercer et al. |
| 4,469,017 | A | 9/1984 | Hanlon |
| 4,470,607 | A | 9/1984 | Schier |
| 4,483,458 | A | 11/1984 | Minning et al. |
| 4,565,297 | A | 1/1986 | Korner et al. |
| H206 | H | 2/1987 | Newhall et al. |
| 4,649,963 | A | 3/1987 | Raghavan et al. |
| 4,669,760 | A | 6/1987 | Hashish et al. |
| 4,679,826 | A | 7/1987 | Olsen |
| 4,730,835 | A | 3/1988 | Wilcox et al. |
| 4,757,751 | A | 7/1988 | Munoz |
| 4,764,394 | A | 8/1988 | Conrad |
| 4,858,967 | A | 8/1989 | Tremoulet et al. |
| 4,863,197 | A | 9/1989 | Munoz |
| 4,878,320 | A | 11/1989 | Woodson |
| 4,890,937 | A | 1/1990 | Balsells |
| 4,903,388 | A | 2/1990 | Skönvall |
| 4,934,111 | A | 6/1990 | Hasish et al. |
| 4,936,197 | A | 6/1990 | Brent |
| 5,014,423 | A | 5/1991 | Raghavan |
| 5,015,000 | A | 5/1991 | Perini |
| 5,037,276 | A | 8/1991 | Tremoulet |
| 5,037,277 | A | 8/1991 | Tan |
| 5,092,609 | A | 3/1992 | Balzano et al. |
| 5,120,084 | A | 6/1992 | Hashimoto |
| 5,139,202 | A | 8/1992 | Munoz et al. |
| 5,147,189 | A | 9/1992 | Barnowski |
| 5,165,703 | A | 11/1992 | Morvant |
| 5,171,327 | A | 12/1992 | Koch et al. |
| 5,172,939 | A | 12/1992 | Hashimoto |
| 5,209,406 | A | 5/1993 | Johnson |
| 5,230,363 | A | 7/1993 | Winn et al. |
| 5,255,853 | A | 10/1993 | Munoz |
| 5,352,254 | A | 10/1994 | Celikkaya |
| 5,364,190 | A | 11/1994 | Ochiai et al. |
| 5,468,066 | A | 11/1995 | Hammonds |
| 5,472,367 | A | 12/1995 | Slocum et al. |
| 5,493,954 | A | 2/1996 | Kostohris et al. |
| 5,505,653 | A | 4/1996 | Nedo et al. |
| 5,508,368 | A | 4/1996 | Knapp et al. |
| 5,508,596 | A | 4/1996 | Olsen |
| 5,551,703 | A | 9/1996 | Morvant |
| 5,643,058 | A | 7/1997 | Erichsen et al. |
| 5,676,384 | A | 10/1997 | Culpepper |
| 5,771,873 | A | 6/1998 | Potter et al. |
| 5,794,858 | A | 8/1998 | Munoz |
| 5,837,921 | A | 11/1998 | Rinaldi et al. |
| 5,892,345 | A | 4/1999 | Olsen |
| 5,948,332 | A | 9/1999 | Prenger |
| 5,979,945 | A | 11/1999 | Hitachi et al. |
| 5,992,904 | A | 11/1999 | Hitachi et al. |
| 6,086,070 | A | 7/2000 | Tremoulet et al. |
| 6,098,677 | A | 8/2000 | Wegman et al. |
| 6,113,304 | A | 9/2000 | Tremoulet et al. |
| 6,132,657 | A | 10/2000 | Cohen et al. |
| 6,136,386 | A | 10/2000 | Nakahigashi et al. |
| 6,155,092 | A | 12/2000 | Sahlem |
| 6,162,031 | A | 12/2000 | Tremoulet |
| 6,172,163 | B1 | 1/2001 | Rein et al. |
| 6,213,095 | B1 | 4/2001 | Asada et al. |
| 6,227,768 | B1 | 5/2001 | Higuchi et al. |
| 6,245,272 | B1 | 6/2001 | Takita et al. |
| 6,299,510 | B1 | 10/2001 | Massenburg |
| 6,302,405 | B1 | 10/2001 | Edwards |
| 6,340,060 | B1 | 1/2002 | Larsson et al. |
| 6,375,547 | B1 | 4/2002 | Massenburg |
| 6,408,826 | B2 | 6/2002 | Asada et al. |
| 6,425,804 | B1 | 7/2002 | Pettit et al. |
| 6,450,546 | B1 | 9/2002 | Montgomery et al. |
| 6,474,867 | B1 | 11/2002 | Perrone |
| 6,482,343 | B1 | 11/2002 | Cohen et al. |
| 6,497,219 | B2 | 12/2002 | Natsume |
| D470,566 | S | 2/2003 | Sciulli et al. |
| 6,536,998 | B2 | 3/2003 | Hyatt et al. |
| 6,544,012 | B1 | 4/2003 | Blume |
| 6,548,173 | B2 | 4/2003 | Erdemir et al. |
| 6,725,624 | B2 | 4/2004 | Hirath et al. |
| 6,736,407 | B2 | 5/2004 | Tremoulet et al. |
| 6,769,695 | B2 | 8/2004 | Stephens |
| 6,802,541 | B2 | 10/2004 | Hopkins et al. |
| 6,860,517 | B2 | 3/2005 | Sanders |
| 6,913,266 | B2 | 7/2005 | Jarchau et al. |
| 6,922,605 | B1 | 7/2005 | Olsen |
| 6,931,776 | B2 | 8/2005 | Wagner et al. |
| 6,932,285 | B1 | 8/2005 | Zeng |
| D515,675 | S | 2/2006 | Tremoulet et al. |
| 7,035,708 | B1 | 4/2006 | Olsen |
| 7,073,611 | B2 | 7/2006 | Sui et al. |
| 7,074,112 | B2 | 7/2006 | Olsen |
| 7,090,054 | B2 | 8/2006 | Iwamasa et al. |
| 7,094,135 | B2 | 8/2006 | Chisum et al. |
| 7,153,186 | B2 | 12/2006 | Popescu et al. |
| 7,220,381 | B2 | 5/2007 | Ting et al. |
| 7,247,006 | B2 | 7/2007 | Hopkins et al. |
| D561,877 | S | 2/2008 | Hopkins et al. |
| 7,367,789 | B2 | 5/2008 | Raghavan et al. |
| 7,465,215 | B2 | 12/2008 | Shimizu et al. |

(56) References Cited

U.S. PATENT DOCUMENTS

| | | | |
|---|---|---|---|
| 7,523,694 B2 | 4/2009 | Aday et al. | |
| 7,546,224 B2 | 6/2009 | Campbell | |
| 7,568,424 B2 | 8/2009 | Hopkins et al. | |
| 7,641,864 B2 | 1/2010 | Tremoulet et al. | |
| D616,966 S | 6/2010 | Angell | |
| 7,739,779 B2 | 6/2010 | Bergman et al. | |
| 7,748,750 B2 | 7/2010 | Raghavan et al. | |
| H2243 H | 8/2010 | Stang | |
| 7,815,490 B2 | 10/2010 | Liu | |
| 7,818,986 B1 | 10/2010 | Parker et al. | |
| 7,823,264 B1 | 11/2010 | Halling | |
| 7,829,036 B2 | 11/2010 | Kumar et al. | |
| D631,142 S | 1/2011 | Angell | |
| 8,123,591 B2 | 2/2012 | Olsen | |
| 8,277,206 B2 | 10/2012 | Raghavan et al. | |
| 8,333,387 B2 | 12/2012 | Wheeler | |
| 8,342,912 B2 | 1/2013 | Funatsu et al. | |
| 8,414,715 B2 | 4/2013 | Altschuler et al. | |
| 8,434,399 B2 | 5/2013 | Gambier et al. | |
| 8,475,230 B2 | 7/2013 | Summers et al. | |
| 8,593,086 B2 | 11/2013 | Hay et al. | |
| 8,821,213 B2 | 9/2014 | Liu et al. | |
| 8,892,236 B2 | 11/2014 | Olsen | |
| 8,904,912 B2 | 12/2014 | Raghavan et al. | |
| 8,920,213 B2 | 12/2014 | Liu | |
| 9,003,955 B1 | 4/2015 | Stang et al. | |
| 9,011,204 B2 | 4/2015 | Raghavan et al. | |
| 9,044,873 B2 | 6/2015 | Guglielmetti et al. | |
| 9,050,704 B1 | 6/2015 | Liu et al. | |
| 9,067,331 B2 | 6/2015 | Stang | |
| 9,090,808 B1 | 7/2015 | Liu et al. | |
| 9,095,955 B2 | 8/2015 | Raghavan et al. | |
| 9,108,297 B2 | 8/2015 | Schubert et al. | |
| 9,138,863 B2 | 9/2015 | Schubert et al. | |
| 9,163,617 B2 | 10/2015 | Mann | |
| 9,272,437 B2 | 3/2016 | Hashish et al. | |
| 9,273,682 B2 | 3/2016 | Stang | |
| 9,283,656 B2 | 3/2016 | Schubert et al. | |
| 9,309,873 B2 | 4/2016 | Roll | |
| 9,370,871 B2 | 6/2016 | Hashish et al. | |
| 9,492,908 B2 | 11/2016 | Schubert et al. | |
| 9,573,289 B2 | 2/2017 | Hashish et al. | |
| 9,574,684 B1 | 2/2017 | Fonte | |
| 9,586,306 B2 | 3/2017 | Zhang et al. | |
| 9,610,674 B2 | 4/2017 | Raghavan et al. | |
| 9,636,799 B2 | 5/2017 | Liu et al. | |
| 9,638,330 B2 | 5/2017 | Itou | |
| 9,638,357 B1 | 5/2017 | Raghavan et al. | |
| 9,649,744 B2 | 5/2017 | Raghavan et al. | |
| 9,658,613 B2 | 5/2017 | Henning et al. | |
| 9,720,399 B2 | 8/2017 | Henning et al. | |
| 9,727,051 B2 | 8/2017 | Henning et al. | |
| 9,772,620 B2 | 9/2017 | Henning et al. | |
| 9,810,205 B2 | 11/2017 | Raghavan et al. | |
| 9,827,649 B2 | 11/2017 | Schubert et al. | |
| 9,884,406 B2 | 2/2018 | Hashish et al. | |
| 9,891,617 B2 | 2/2018 | Henning et al. | |
| 9,976,675 B1 | 5/2018 | Raghavan et al. | |
| 9,989,954 B2 | 6/2018 | Henning et al. | |
| 10,010,999 B2 | 7/2018 | Raghavan et al. | |
| 10,048,676 B2 | 8/2018 | Henning et al. | |
| 10,146,209 B2 | 12/2018 | Henning et al. | |
| 10,201,914 B2 | 2/2019 | Schlough et al. | |
| 10,267,306 B2 * | 4/2019 | McLoughlin | F04B 49/06 |
| 10,513,010 B2 | 12/2019 | Schneidau | |
| 10,564,627 B2 | 2/2020 | Henning et al. | |
| 10,606,240 B2 | 3/2020 | Henning et al. | |
| 10,642,252 B2 | 5/2020 | Henning et al. | |
| 10,656,622 B2 | 5/2020 | Henning et al. | |
| 10,675,733 B2 | 6/2020 | Zhang et al. | |
| 10,780,551 B2 | 9/2020 | Zhang et al. | |
| 10,801,651 B2 | 10/2020 | Olsen et al. | |
| 10,808,688 B1 | 10/2020 | Raghavan et al. | |
| 10,859,997 B1 | 12/2020 | Miles et al. | |
| 10,864,613 B2 | 12/2020 | Raghavan et al. | |
| 10,900,501 B2 | 1/2021 | Trieb | |
| 10,955,078 B2 | 3/2021 | Mann | |
| 10,981,259 B2 | 4/2021 | Lerea et al. | |
| 10,983,503 B2 | 4/2021 | Henning et al. | |
| 10,990,080 B2 | 4/2021 | Henning et al. | |
| 11,125,360 B2 | 9/2021 | Raghavan et al. | |
| D934,920 S | 11/2021 | Farnsworth et al. | |
| 11,224,987 B1 | 1/2022 | Guglielmetti | |
| D967,941 S | 10/2022 | Osterhouse et al. | |
| D975,244 S | 1/2023 | Osterhouse et al. | |
| 11,554,461 B1 | 1/2023 | Miles et al. | |
| 11,577,366 B2 | 2/2023 | Schubert et al. | |
| 11,630,433 B1 | 4/2023 | Miles et al. | |
| 11,693,387 B2 | 7/2023 | Henning et al. | |
| 11,719,354 B2 | 8/2023 | Osterhouse et al. | |
| 11,872,670 B2 | 1/2024 | Schubert et al. | |
| 11,904,494 B2 | 2/2024 | Osterhouse | |
| 12,064,893 B2 | 8/2024 | Osterhouse | |
| 12,186,858 B2 | 1/2025 | Miles et al. | |
| 2003/0067168 A1 | 4/2003 | Sches et al. | |
| 2003/0122376 A1 | 7/2003 | Hopkins et al. | |
| 2003/0141617 A1 | 7/2003 | Prevotat et al. | |
| 2003/0146229 A1 | 8/2003 | Munoz | |
| 2004/0108000 A1 | 6/2004 | Raghavan et al. | |
| 2004/0198179 A1 | 10/2004 | Gadd | |
| 2005/0017091 A1 | 1/2005 | Olsen et al. | |
| 2005/0098963 A1 | 5/2005 | Olsen | |
| 2007/0037495 A1 | 2/2007 | Matsubara et al. | |
| 2007/0039968 A1 | 2/2007 | Ting et al. | |
| 2007/0186604 A1 | 8/2007 | Koppensteiner | |
| 2007/0252340 A1 | 11/2007 | Karl et al. | |
| 2008/0019851 A1 | 1/2008 | Hopkins et al. | |
| 2008/0110229 A1 | 5/2008 | Badlani et al. | |
| 2009/0139595 A1 | 6/2009 | Kato et al. | |
| 2009/0151701 A1 | 6/2009 | Kato et al. | |
| 2010/0088894 A1 | 4/2010 | Stark et al. | |
| 2010/0199740 A1 | 8/2010 | Muschalik et al. | |
| 2011/0084476 A1 | 4/2011 | Nishida | |
| 2011/0232355 A1 | 9/2011 | Evans et al. | |
| 2011/0297269 A1 | 12/2011 | Pilon et al. | |
| 2012/0021676 A1 | 1/2012 | Schubert et al. | |
| 2012/0196516 A1 | 8/2012 | Funatsu et al. | |
| 2012/0247296 A1 | 10/2012 | Stang et al. | |
| 2012/0252325 A1 | 10/2012 | Schubert et al. | |
| 2012/0252326 A1 | 10/2012 | Schubert et al. | |
| 2013/0005225 A1 | 1/2013 | Russo | |
| 2013/0025425 A1 | 1/2013 | Knaupp et al. | |
| 2013/0087039 A1 | 4/2013 | Roll | |
| 2013/0112393 A1 | 5/2013 | Cumby et al. | |
| 2013/0161013 A1 | 6/2013 | McCoy et al. | |
| 2013/0202907 A1 | 8/2013 | Niccolls et al. | |
| 2013/0206778 A1 | 8/2013 | Lukyanets et al. | |
| 2014/0015202 A1 | 1/2014 | Chacko et al. | |
| 2014/0015245 A1 | 1/2014 | Chiu | |
| 2014/0124184 A1 | 5/2014 | Tokura | |
| 2014/0273768 A1 | 9/2014 | Guglielmetti et al. | |
| 2014/0377485 A1 | 12/2014 | Berger et al. | |
| 2015/0031270 A1 | 1/2015 | Miller | |
| 2015/0082606 A1 | 3/2015 | Nakajima et al. | |
| 2016/0298614 A1 | 10/2016 | Gaillard | |
| 2017/0059058 A1 * | 3/2017 | Hemme | F16K 31/506 |
| 2018/0104843 A1 | 4/2018 | Adams et al. | |
| 2018/0161958 A1 | 6/2018 | Schubert et al. | |
| 2018/0264625 A1 | 9/2018 | Schneidau | |
| 2020/0406424 A1 | 12/2020 | Zhang et al. | |
| 2021/0046610 A1 | 2/2021 | Schubert et al. | |
| 2021/0107114 A1 | 4/2021 | Linde | |
| 2021/0154799 A1 | 5/2021 | Dean, Jr. et al. | |
| 2021/0187778 A1 | 6/2021 | Denney et al. | |
| 2021/0192922 A1 | 6/2021 | Vandergon et al. | |
| 2021/0221534 A1 | 7/2021 | Henning et al. | |
| 2021/0291332 A1 | 9/2021 | Vandergon et al. | |
| 2021/0299903 A1 | 9/2021 | Osterhouse | |
| 2021/0299904 A1 | 9/2021 | Osterhouse | |
| 2021/0301936 A1 | 9/2021 | Osterhouse et al. | |
| 2022/0057774 A1 | 2/2022 | Vandergon et al. | |
| 2023/0143795 A1 | 5/2023 | Schubert et al. | |

(56) References Cited

U.S. PATENT DOCUMENTS

| | | | |
|---|---|---|---|
| 2023/0191561 | A1 | 6/2023 | Guglielmetti et al. |
| 2023/0191644 | A1 | 6/2023 | Guglielmetti et al. |

FOREIGN PATENT DOCUMENTS

| | | | | |
|---|---|---|---|---|
| EP | 0391489 | A1 | 10/1990 | |
| EP | 1477873 | A1 * | 11/2004 | ........... F16K 31/047 |
| EP | 2236893 | A3 | 1/2011 | |
| FR | 2452969 | A1 | 10/1980 | |
| KR | 930008692 | A | 5/1993 | |
| KR | 1019930008692 | B1 | 9/1993 | |
| KR | 101678356 | B1 | 11/2016 | |
| WO | 03055644 | A1 | 7/2003 | |
| WO | 2013109474 | A1 | 7/2013 | |
| WO | 2014054472 | A1 | 8/2016 | |
| WO | 2018197018 | A1 | 11/2018 | |

OTHER PUBLICATIONS

Hu et al., Computer Modeling and Optimization of Swage Autofrettage Process of a Thick-Walled Cylinder Incorporating Bauschinger Effect, Jan. 14, 2014, American Transactions on Engineering & Applied Sciences, vol. 3, pp. 31-63.

American Rifleman, Ruger New Model Single-Six .17 HMR, Sep. 2003, pp. 90-96, Year: 2003.

IHS ESDU, “Guide to Stress Concentration Data,” The Royal Aeronautical Society—The Institution of Mechanical Engineers, 64001 Issued Jun. 1976, 6 pages.

Hydraulics & Pneumatics—Serving Fluid Power and Motion Control Engines Worldwide, http://www.hydraulicspneumatics.com/200/TechZone/FittingsCouplin/Article/True/6421/ , 2010, 2 pages.

Pilkey, Walter D., “Peterson’s Stress Concentration Factors, Chapter 4 Holes,” Second Edition, John Wiley & Sons, Inc., Copyright 1997, 48 pages.

Stephens, Ralph et al., “Metal Fatigue in Engineering, Chapter 7 Notches and their effects,” Second Edition, John Wiley & Sons, Inc., Copyright 2001, Chapter 7, 10 pages.

Stress Concentration—Wikipedia, http://wikipedia.org/wiki/Stress_concentration, accessed Oct. 5, 2011, 3 pages.

Timoshenko, S. P., et al., “Theory of Elasticity,” Third Edition, McGraw Hill Book Company, Copyright 1934, pp. 90-97, 181-194, 209-217.

Genuine Flow Parts—87K High-Pressure Cylinder, Pump Type Compatibility, 94k HyperJet, Flow Shape Technologies Group, copyright 2021 Flow International Corporation, https://flowparts.com/collections/high-pressure-components/products/cylinder-hp-cartridge-87k-2-0-intn [last accessed Feb. 26, 2021], 4 pages.

Waterjet cutting head parts, 60k high pressure HP Cylinder body for Jet Edge / sunrise water jet head intensifier pump SR20004, copyright 2010-2020 AliExpress.com, https://www.aliexpress.com/item/33039960455.html [last accessed Mar. 29, 2021], 5 pages.

OMAX Accessory Specifications A-Jet, Precision Abrasive Waterjet Accessories, Jan. 2010, 1 page.

Savin, G.N., “Stress Concentration Around Holes,” Pergamon Press, 1961, pp. 72-80, 104-112, 123-142, 205-225.

* cited by examiner

MOTORIZED SYSTEMS AND ASSOCIATED METHODS FOR CONTROLLING AN ADJUSTABLE DUMP ORIFICE ON A LIQUID JET CUTTING SYSTEM

CROSS-REFERENCE TO RELATED APPLICATIONS INCORPORATED BY REFERENCE

The present application claims priority to U.S. Provisional App. No. 62/952,013, titled MOTORIZED METHOD FOR CONTROLLING AN ADJUSTABLE DUMP ORIFICE ON A LIQUID JET CUTTING SYSTEM, which was filed on Dec. 20, 2019, and is incorporated herein by reference in its entirety.

TECHNICAL FIELD

The present disclosure is generally related to systems and methods for controlling operating pressures of liquid jet cutting systems and, more particularly, to the operation of dump orifices on liquid jet cutting systems.

BACKGROUND

In liquid jet cutting systems, manually adjustable dump orifices (ADO) are commonly used to maintain operating pressure of the cutting system when the system is in a specific operational state or transitioning between different operational states. For example, an ADO can dump water to maintain system pressure at a desired level when the cutting head nozzle is closed, when the cutting system is between cuts, etc. Conventional ADOs include a hand knob that the operator/technician manually adjusts to set the ADO at a desired position/state.

In practice, some operators find that the hand knob is difficult to access and/or that the ADO adjustment process is tedious. As a result, operators may fail to check and/or manually adjust the ADO as often as necessary, resulting in undesirable spikes and dips in the system pressure during operation which can lead to increased fatigue and premature wear of the high-pressure system components.

DETAILED DESCRIPTION

The following disclosure describes various embodiments of automatically controlled adjustable dump orifices (ADO) for use with liquid jet cutting systems, such as water jet cutting systems. As described in greater detail below, in some embodiments the automatically controlled ADOs disclosed herein include an electric motor that controls the ADO in response to pressure feedback from the liquid jet cutting system. For example, the motor can be operably connected in a closed-loop control system that monitors liquid pressure or pressures within the liquid jet cutting system (e.g., within the cutting head, the pump, etc.) and utilizes this pressure as feedback or input to control the motor and selectively adjust the setting of the ADO to thereby maintain the pressure in the system at a desired level. In some embodiments, the control system compares the pressure in the liquid jet cutting system to the pressure set point of the pump, and if the difference between the pressure in the system and the set point of the pump is greater than a preset threshold, the control system operates the motor on the ADO as necessary to reduce the difference so that it is within the threshold. Additionally, in some embodiments, when a new orifice is installed at the cutting head, the control system can direct the motor to initially adjust the setting of the ADO to an approximate position (e.g., a predetermined and/or theoretically-calculated position for new orifices) and then the control system "fine tunes" the ADO setting via the pressure feedback loop as the liquid jet cutting system comes up to pressure and begins operation. Embodiments of the motorized ADO control systems described herein can reduce the need for operator involvement, provide a reliable solution for controlling system pressures, and reduce overall component fatigue and wear due to pressure spikes/dips.

Figure 1:
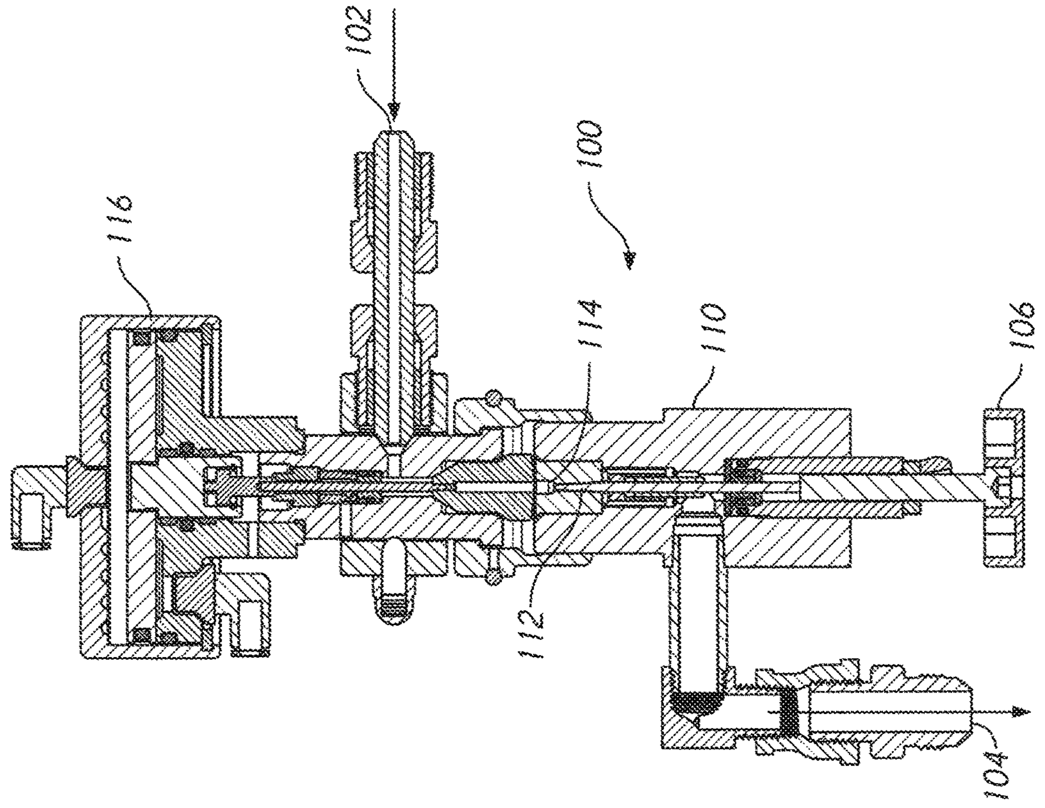
FIG. 1 (Prior Art)
FIG. 1 is a cross-sectional side view of a conventional adjustable dump orifice configured in accordance with the prior art.

FIG. 1 is a cross-sectional side view of a conventional manually adjusted ADO 100. The ADO 100 includes a valve housing 110 that contains a dump orifice 114. The dump orifice 114 receives high-pressure liquid from the cutting system via an inlet 102 when an on/off valve 116 is in an "open" position. Liquid flowing through the dump orifice 114 exits the valve housing 110 via an outlet 104. The flow of high-pressure liquid through the dump orifice 114 is controlled by the position of a stem 112, which is in turn controlled by manual adjustment of a hand crank or knob 106. More specifically, an operator can manually turn the knob 106 in a first direction to advance the stem 112 toward the dump orifice 114, thereby reducing the cross-sectional flow area downstream of the orifice 114 and increasing the system pressure. Conversely, the operator can rotate the hand knob 106 in the opposite direction to move the stem 112 away from the dump orifice 114, thereby increasing the cross-sectional flow area and reducing the system pressure.

During setup and operation of the liquid jet cutting system, the ADO 100 will typically need frequent manual adjustment to maintain the pressure in the system at a desired level while the system is not cutting. The need for frequent adjustment can be caused by a number of different factors, including changes in size of the stem 112 resulting from thermal expansion and contraction in use, and from wear of the stem 112 over time. The change in size of the stem 112 can affect the flow of high-pressure liquid through the dump orifice 114 and the corresponding system pressure, requiring that the ADO 100 be manually adjusted to maintain the pressure at the desired level. Additionally, the ADO 100 will usually need readjustment when a new cutting nozzle orifice is installed, because of variability in dimensions between different orifices. If the position of the stem 112 is not adjusted as it expands, contracts and/or wears, or when a new orifice is installed, then pressure spikes and dips can occur when the cutting head nozzle switches between operational states (e.g., when transitioning between cuts). These pressure spikes/dips can have adverse effects on the liquid jet cutting system, including increased fatigue and premature wear of high-pressure components, and on the quality of the work product created by the liquid jet cutting system.

In practice, however, some operators may find that the hand knob 106 is difficult to access and/or that the ADO adjustment process is tedious. As a result, operators may fail to check and/or adjust the ADO 100 as often as necessary, resulting in spikes and dips in the system pressure during operation which, as noted above, can lead to increased fatigue and premature wear of the high-pressure system components. Additionally, at times the operator may turn the adjustment knob 106 in either too far or too hard, thereby causing the stem 112 to become stuck in its seat and cause a pressure spike during operation, and possibly requiring a subsequent rebuild or replacement of the ADO 100.

Certain details are set forth in the following description and in FIGS. 2-4 to provide a thorough understanding of various embodiments of the present technology. In other instances, well-known structures, materials, operations and/or systems often associated with liquid jet cutting systems (e.g., water jet cutting systems), electric motors, computer processing systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the present technology. Accordingly, other embodiments can have other details, dimensions, angles and features without departing from the spirit or scope of the present disclosure. In addition, those of ordinary skill in the art will appreciate that further embodiments of the present technology can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 210 is first introduced and discussed with reference to FIG. 2.

Figure 2:
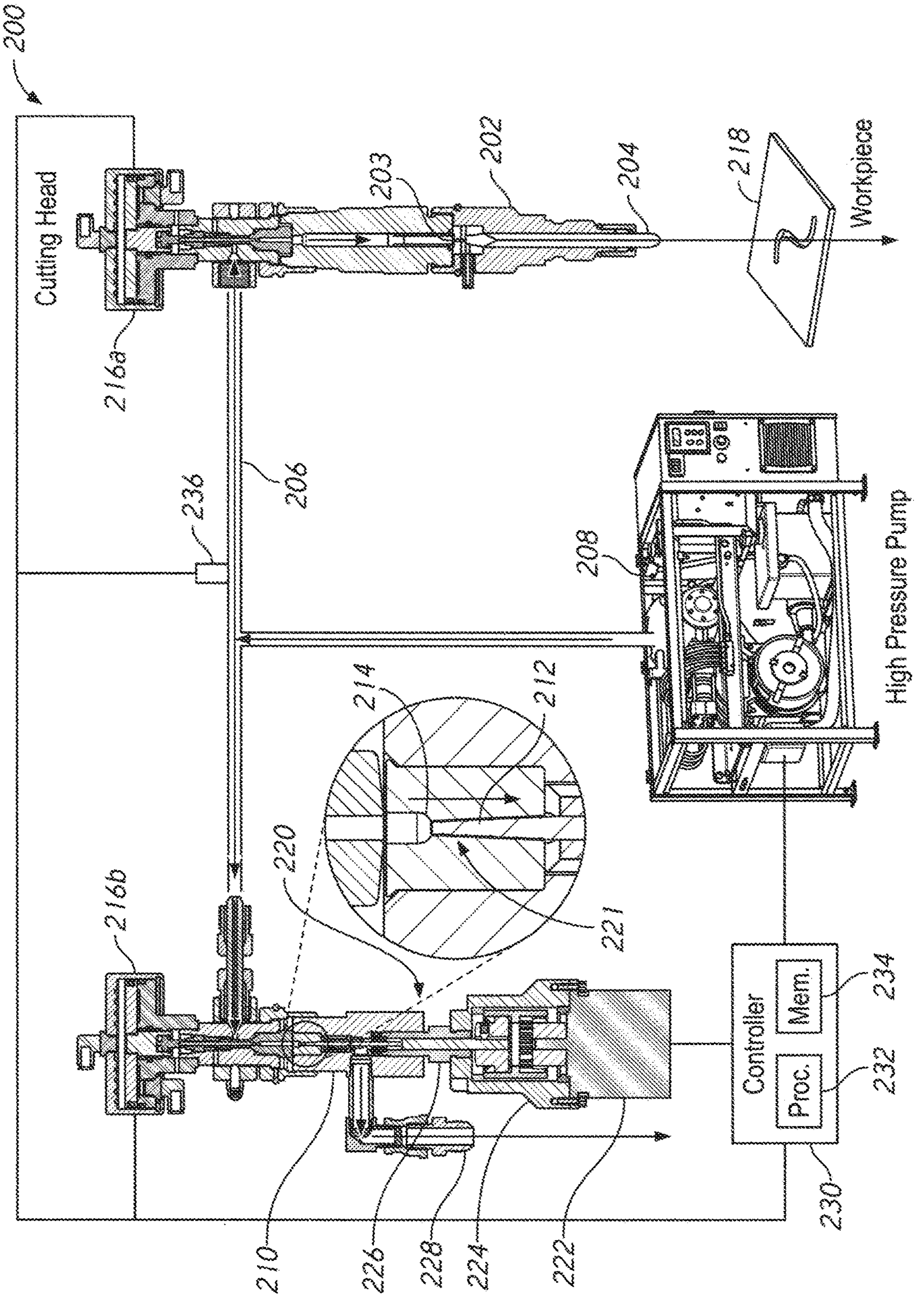
FIG. 2 is partially schematic view of a liquid jet cutting system having a motorized adjustable dump orifice configured in accordance with some embodiments of the present technology.

FIG. 2 is a partially schematic diagram of a liquid jet cutting system 200 having an automatically controlled adjustable dump orifice 220 configured in accordance with embodiments of the present technology. As described in greater detail below, in some embodiments the automatically controlled adjustable dump orifice 220 can be operated by a motor 222 (e.g., an electric motor), and thus may be referred to herein as the "motorized adjustable dump orifice 220" or "motorized ADO 220." In the illustrated embodiment, the liquid jet cutting system 200 includes a cutting head 202 that receives high-pressure liquid (e.g., high-pressure water) from a pressurizing system (e.g., a pump 208) via a high-pressure conduit 206. The high-pressure liquid flows through an orifice 203 in the cutting head 202 and, in some embodiments, can be mixed with abrasive material to form a high-pressure jet that is emitted from a nozzle 204. Flow of the high-pressure liquid from the pump 208 to the cutting head 202 can be controlled by a first valve 216*a* which, in some embodiments, can have an "open" or "on" position and a "closed" or "off" position, and hence can be referred to as an "on/off valve" 216*a*. In the illustrated embodiment, the high-pressure conduit 206 is also connected in fluid communication to the motorized ADO 220. Like the cutting head 202, the flow of high-pressure liquid from the conduit 206 to the motorized ADO 220 is controlled by a second value 216*b* (e.g., a second "on/off valve"). In some embodiments, the high-pressure pump 208 can be a positive displacement pump (e.g., a rotary direct drive pump or a "crankshaft-driven" pump) which are well known in the art. In other embodiments, the pump 208 can be an intensifier pump or other suitable liquid pressurizing devices known in the art that are configured to pressurize liquid (e.g., water) to pressures suitable for liquid jet cutting, shaping, etc. Such pressures can include, for example, pressures greater than or equal to, e.g., 10,000 psi and less than or equal to, e.g., 130,000 psi. For example, in some embodiments the pump 208 can be configured to provide high-pressure liquid for liquid jet cutting at pressures between 20,000-120,000 psi, between 30,000-120,000 psi, between 40,000-120,000 psi, and/or between 50,000-120,000 psi. Although the motorized ADO 220 is schematically illustrated as being separate from the pump 208 in FIG. 2 for purposes of illustration, in some embodiments the motorized ADO 220 can be positioned, e.g., in the pump housing or otherwise located proximate to the pump 208 and/or operably connected in fluid communication therewith.

In the illustrated embodiment, the motorized ADO 220 includes a valve housing 210 that contains an adjustable dump orifice 214. The flow of high-pressure liquid through the dump orifice 214 is controlled by a dump orifice valve 221 that includes a tapered pin or "stem" 212. As described in greater detail below with reference to FIGS. 3A and 3B, the position of the stem 212 is controlled by the motor 222, which is operably coupled to the valve housing 210 by means of a coupling housing 224 and a corresponding adaptor 226. By way of example, the motor 222 can be any suitable type of machine (e.g., an electric motor) that converts electrical energy into mechanical energy including, for example, stepper motors, servo motors (e.g., precision servo motors), linear motors, etc. In some embodiments, for example, the motor 222 can be a NEMA 23 stepper motor. In some embodiments, the motor 222 can include an encoder (e.g., a rotary encoder) to, for example, return or move the motor output shaft to an "absolute" or selected position, but in other embodiments an encoder can be omitted. In other embodiments, it is contemplated that the motor 222 can be other types of suitable drivers or drive devices that can move the stem 212 or otherwise control operation of the dump orifice valve 221. Such devices can include, for example, hydraulically and/or pneumatically powered devices.

In the illustrated embodiment, the liquid jet cutting system 200 further includes a controller 230 (shown schematically) operably connected to the pump 208, the motor 222, the first and second on/off valves 216*a, b*, and one or more pressure sensors 236. In some embodiments, the pressure sensor 236 can be a potentiometric pressure transducer configured to provide an electronic signal to the controller 230 that is indicative of the operating pressure of the liquid contained in the high-pressure conduit 206. In other embodiments, other types of pressure sensing devices known in the art can be used to provide pressure information to the controller 230, including other types of pressure transducers, piezoelectric pressure sensors, strain gauge pressure sensors, electromagnetic pressure sensors, optical pressure sensors, inductive pressure sensors, capacitive pressure sensors, variable reluctance pressure sensors, etc. Although, the pressure sensor 236 is illustrated as being operably connected to the high-pressure conduit 206 and in fluid communication therewith, in other embodiments the pressure sensor 236 and/or other pressure sensors can be mounted to the pump 208 (to, e.g., monitor the pressure at the pump 208), to the cutting head 202, and/or to other portions of the system 200 to monitor and/or determine the pressure of the working liquid and provide a corresponding signal or signals to the controller 230. Additionally, it will be appreciated that although a single pressure sensor 236 is illustrated in FIG. 2, in other embodiments two or more pressure sensors can be used to monitor the pressure of the high-pressure liquid in the cutting system 200. In some embodiments, the controller 230 can also be operably connected to a user interface of the pump 208, and/or to a separate user interface (e.g., touchpad, keypad, etc.) for receiving user inputs for controlling operation of the liquid jet cutting system 200.

The controller 230 can include one or more processors 232 and memory 234 that can be programmed with instructions (e.g., non-transitory computer-readable instructions contained on a computer-readable medium) that, when executed by the one or more processors 232, control operation of the motor 222 and/or other portions of the liquid jet cutting system 200. For example, in some embodiments, the controller 230 can be operably connected to the motor 222 and the pressure sensor 236 in a closed loop system in which the controller 230 receives feedback (e.g., liquid pressures) from the pressure sensor 236 during operation of the liquid jet cutting system 200, and then responds by adjusting the setting of the dump orifice valve 221 via the motor 222 as necessary to achieve a desired operating pressure. In some embodiments, the desired operating pressure can be the pressure set point of the pump 208 (i.e., the pressure that the operator sets the pump 208 to operate at). In such embodiments, the controller 230 can compare the liquid pressure in the system as indicated by the pressure sensor 236 to the pressure set point of the pump 208, and if the liquid pressure in the system differs from the pressure set point by more than a preset threshold amount (e.g. by more than +/−10 psi, +/−100 psi, +/−200 psi, etc.), the controller 230 responds by adjusting the setting of the dump orifice valve 221 via the motor 222 as necessary to bring the pressure within the threshold. After adjusting the dump orifice valve 221, the controller 230 again receives pressure feedback from the pressure sensor 236 and makes further adjustments to the dump orifice valve 221 if necessary. For example, in some embodiments, when the liquid jet cutting system 200 is cutting a workpiece 218, the pressure of the high-pressure liquid observed in, e.g., the high-pressure conduit 206 (and/or the cutting head 202 and/or the pump 208) should be between about 3,000 to about 5,000 psi higher than the pressure observed in the high-pressure conduit 206 when the cutting head 202 is closed and the motorized ADO 220 is open and dumping liquid, as would occur, for example, when the cutting head 202 is traversing towards the next cut of the workpiece 218. By use of embodiments of the closed loop feedback system described herein, the controller 230 can control the motor 222 as necessary to adjust the dump orifice valve 221 (e.g., a position of the stem 212 and thereby a size of open cross-sectional area through dump orifice valve 221) and maintain the desired operating pressures in the liquid jet cutting system 200 while avoiding detrimental spikes and dips in pressure.

Although some embodiments of the present technology monitor the liquid pressure in the system 200 and utilize the pressure as an input to the controller 230 for control of the motor 222, in other embodiments, the controller 230 can utilize the operating pressure of the pump 208 as feedback or an input for control of the motor 222. In yet other embodiments, rather than using a direct electrical signal from, e.g., the pressure sensor 236 and/or a pressure sensor on the pump 208 or the cutting head 202, the controller 230 can receive digital instructions via software for control of the motor 222. Such instructions can be generated by, e.g., the processor 232 (or another processor associated with the liquid jet cutting system 200) in response to a monitored pressure in the liquid jet cutting system 200. In some embodiments, the controller 230 can be a special purpose computer or data processor that is specifically programmed, configured, or constructed to perform one or more of the operations described in detail herein. While certain functions may be described herein as being performed exclusively by the controller 230, these functions can also be practiced in distributed environments where functions or modules are shared among separate processing devices.

Although certain components and features of the liquid jet cutting system 200 may be omitted from FIG. 2 for purposes of clarity, it will be understood that the cutting system 200 can include additional components and features of liquid jet cutting systems known in the art and, in particular, water jet cutting systems. For example, the liquid jet cutting system 200 can include a user interface (not shown) for receiving user instructions for operating the cutting system 200, and one or more actuators (not shown) for controlling movement of the cutting head 202 in accordance with such instructions. Such actuators can be configured to move the cutting head 202 along a processing path (e.g., cutting path) in two or three dimensions and, in at least some cases, to tilt the cutting head 202 relative to the workpiece 218. The liquid jet cutting system 200 can also include an abrasive-delivery apparatus (also not shown) configured to feed particulate abrasive material from an abrasive material source to the cutting head 202. The system 200 can further include a system controller operably connected to the user interface, the actuators, the abrasive delivery system, etc. In some embodiments, the system controller can be or can include the controller 230. In other embodiments, the controller 230 can be a dedicated controller for controlling operation of the motorized ADO 220 and related components, and the system controller can be a separate controller for controlling other operational aspects of the liquid jet cutting system 200.

Figure 3A:
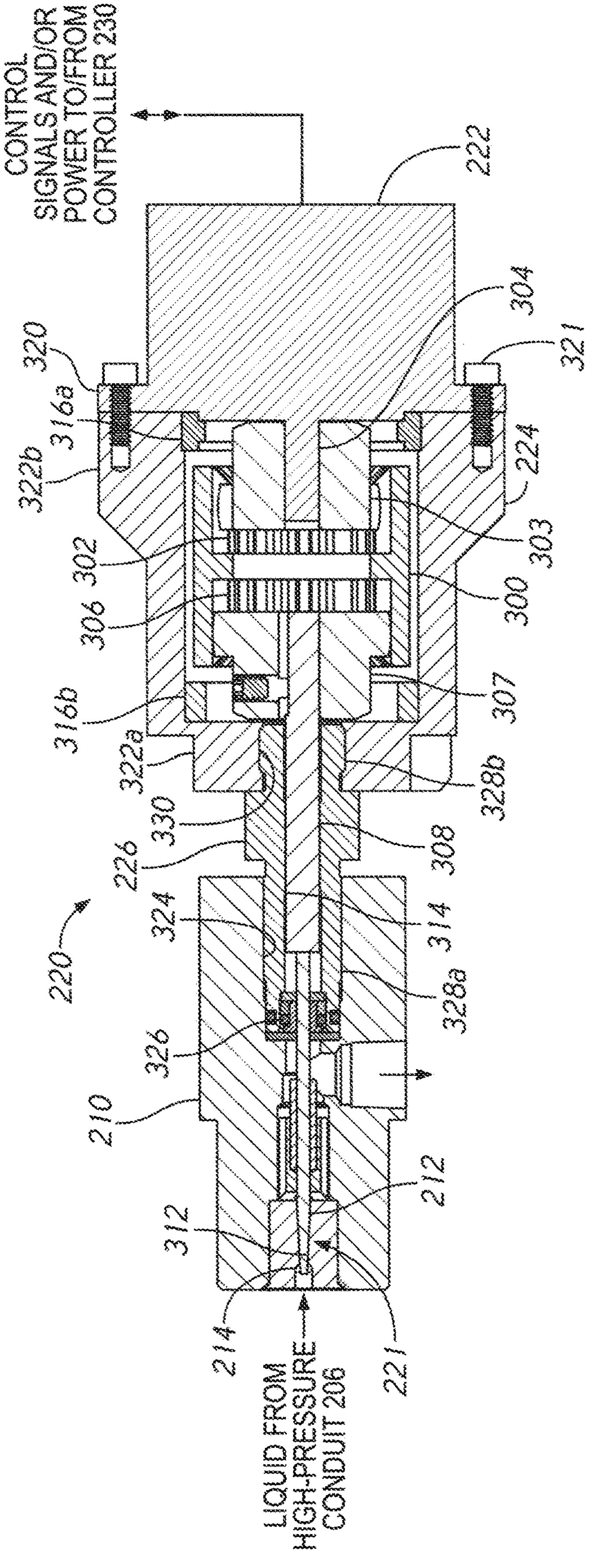
FIG. 3A is a cross-sectional side view of the motorized adjustable dump orifice of FIG. 2.
Figure 3B:
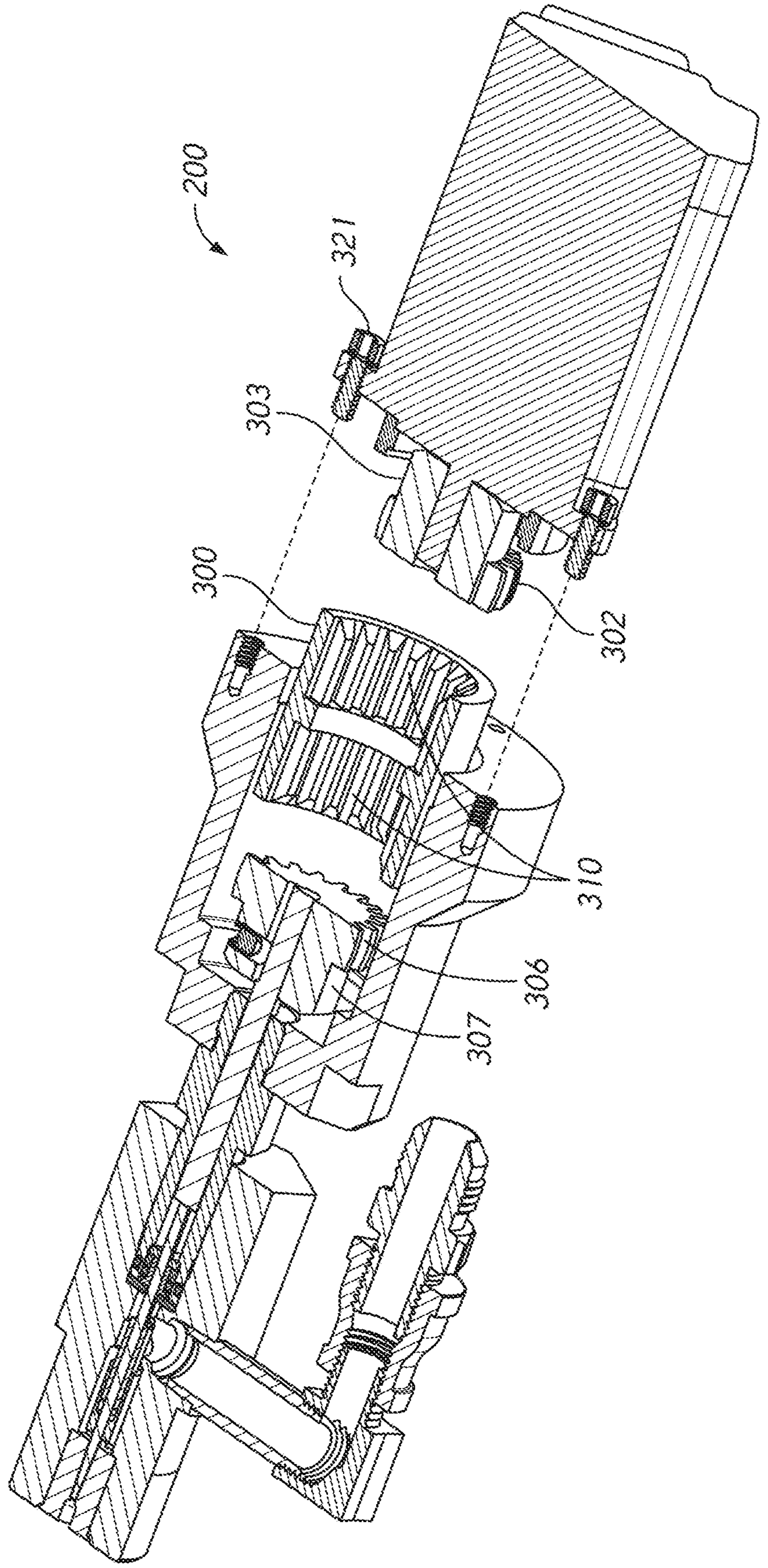
FIG. 3B is a partially exploded cross-sectional isometric view of the motorized adjustable dump orifice, configured in accordance with some embodiments of the present technology.

FIG. 3A is a cross-sectional side view of the motorized ADO 220, and FIG. 3B is a partially exploded cross-sectional isometric view of the motorized ADO 220 configured in accordance with embodiments of the present technology. Referring first to FIG. 3A, in the illustrated embodiment, the elongate stem 212 includes a conically-tapered end portion that is movably received in a corresponding conically-tapered seat 312 positioned downstream of the dump orifice 214. The opposite end portion of the stem 212 abuts or is otherwise operably in contact with a first end portion of a positioning element 308 which is movably received in the adapter 226. More specifically, in the illustrated embodiment the positioning element 308 is an elongate threaded rod that is threadedly received in a corresponding threaded bore 314 in the adapter 226. Accordingly, rotation of the positioning element 308 in a first direction (e.g., a clockwise direction) advances the positioning element 308 through the bore 314 and moves the tapered end portion of the stem 212 toward the tapered seat 312 (i.e., from right to left in FIG. 3A). Movement of the stem 212 toward the tapered seat 312 reduces the cross-sectional flow area (e.g., the annular cross-sectional area) between the tapered end portion of the stem 212 and the sidewall of the tapered seat 312, thereby increasing the pressure of high-pressure liquid flowing through the dump orifice 214. Conversely, rotation of the positioning element 308 in the opposite direction retracts the positioning element 308 through the bore 314 and enables the stem 212 to translate away from the tapered seat 312, thereby increasing the cross-sectional flow area around the tapered end portion of the stem 212 and reducing the pressure of high-pressure liquid flowing through the dump orifice 214.

In the illustrated embodiment, the adapter 226 includes a first end portion 328*a* and a second end portion 328*b*. The first end portion 328*a* is threadedly received in a correspondingly threaded bore 324 in the valve housing 210 and can carry one or more seals 326 to prevent high-pressure liquid from escaping the valve housing 210 around or through the adapter 226. The second end portion 328*b* of the adapter 226 is threadedly received in a corresponding threaded bore 330 in a first flange 322*a* of the coupling housing 224 to fixedly attach the coupling housing 224 to the valve housing 210. The coupling housing 224 further includes a second flange 322*b* that is fixedly attached to a corresponding flange 320 of the motor 222 by means of one or more fasteners 321 (e.g., screws or bolts). In some embodiments, the coupling housing 224 can be made from aluminum. In other embodiments, the coupling housing 224 can be made from other suitable metallic and/or non-metallic materials.

Referring next to FIGS. 3A and 3B together, in another aspect of the illustrated embodiment the motorized ADO 220 further includes a first gear hub 303 and a second gear hub 307. The first gear hub 303 is fixedly attached to an output shaft 304 of the motor 222, and the second gear hub 307 is fixedly attached to the end portion of the positioning element 308 that extends outwardly from the adapter 226. Both gear hubs 303 and 307 can be made from, e.g., steel, and can include a plurality of gear teeth 302 and 306, respectively, concentrically arranged around a periphery thereof. The first gear hub 303 on the motor output shaft 304 is operably engaged with the second gear hub 307 on the positioning element 308 by means of a coupling 300. In the illustrated embodiment, the coupling 300 is a sleeve coupling having a generally cylindrical shape and a plurality of teeth or splines 310 extending inwardly from an interior surface thereof, as best seen in FIG. 3B. The splines 310 are configured to slidably engage the corresponding teeth 302 and 306 on the gear hubs 303 and 307, respectively, to operably couple the output shaft of the motor 222 to the positioning element 308. In some embodiments, the coupling 300 can be a "slide sleeve" coupling made from nylon or other suitably durable materials. In other embodiments, other devices and methods for coupling the motor 222 to the positioning element 308 can be used including, for example, a nylon flex coupling.

In some embodiments, the coupling housing 224 can also contain a first alignment/spacer ring 316*a* and a second spacer ring 316*b*. The first alignment/spacer ring 316*a* is positioned in an annular groove in the motor flange 320 and is configured to concentrically align the motor 222 (or, more specifically, the motor output shaft 304) relative to the coupling housing 224 (or, more specifically, relative to the positioning element 308). In some embodiments, the first alignment/spacer ring 316*a* can also be used to prevent the coupling 300 from moving too far in the direction toward the motor 222 during use and, similarly, the second spacer ring 316*b* can be used as a hard stop to prevent the coupling 300 from moving too far in the direction toward the valve housing 210 and potentially sliding off of the first gear hub 303. In operation, rotational motion of the motor output shaft 304 is transmitted to the positioning element 308 via the first and second gear hubs 303 and 307, respectively, and the coupling 300. As described above, the corresponding rotation of the positioning element 308 in clockwise/counterclockwise directions advances/retracts the positioning element 308 through the bore 314 to move the stem 212 toward/away from the tapered seat 312 and thereby increase/decrease the pressure of high-pressure liquid flowing through the dump orifice 214.

Although, in the illustrated embodiment, the motor 222 produces torque which can selectively drive the output shaft 304 in both clockwise and counterclockwise rotation to adjust the setting of the stem 212, in other embodiments, other types of motors can be used for this purpose. For example, as noted above, in some embodiments a linear electric motor can be used that, instead of producing torque, provides a linear force that can drive, e.g., a corresponding output shaft in fore and aft translational (e.g., linear) motion. By way of example, in such embodiments the positioning element 308 may be an elongate shaft that, rather than rotate in the bore 314, is instead configured to slide fore and aft in the bore 314. Further, the linear output shaft of the motor can be coupled to the sliding positioning element so that linear movement of the output shaft toward the valve housing 210 drives the stem 212 toward the seat 312, while linear movement in the opposite direction moves the stem 212 away from the seat 312, thereby adjusting the flow through the dump orifice 214 and the corresponding system pressures as described above. Accordingly, it will be appreciated that the present technology is not limited to use with electric motors that provide rotational motion, but can also be used with a wide variety of other suitable drive devices (e.g., other types of electric motors) as disclosed herein. In some embodiments, one or more of the operable connections between components of the motorized ADO 220 may be non-threaded. In further embodiments (e.g., those using a linear electric motor), the motor can be directly attached to the valve housing 210 (e.g., without the coupling housing 224 or the adapter 226), and/or the motor output shaft can be directly coupled to the stem 212 (e.g., without the coupling 300).

Figure 4:
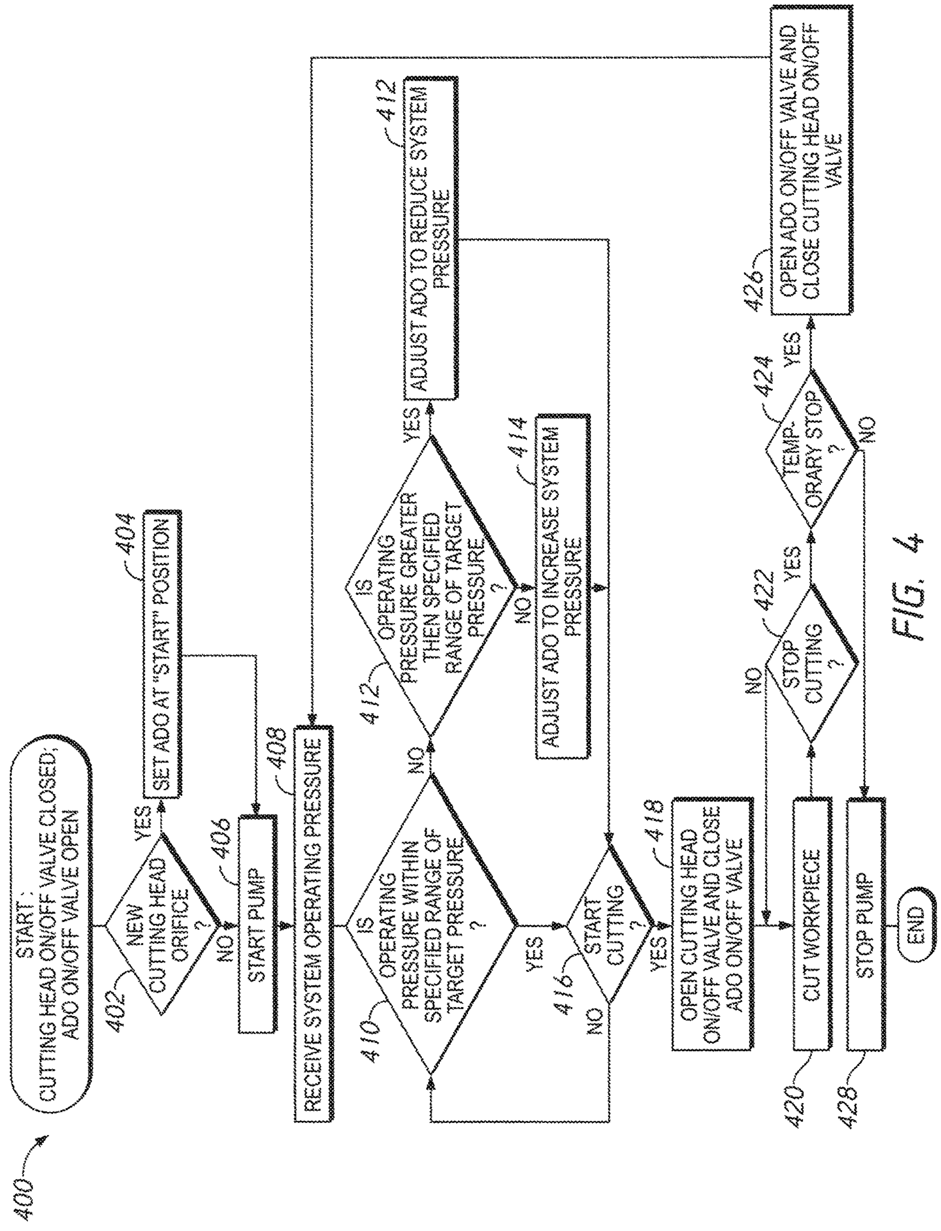
FIG. 4 is a flow diagram of a routine for automatically operating a motorized adjustable dump orifice in accordance with some embodiments of the present technology.

FIG. 4 is a flow diagram of a routine 400 for automatically controlling operation of the motorized ADO 220 described in detail above with reference to FIGS. 2-3B, in accordance with an embodiment of the present technology. All or portions of the routine 400 can be performed by the controller 230 in accordance with computer-readable instructions stored on, e.g., the memory 234. Although the routine 400 is described below in reference to the liquid jet cutting system 200 described above with reference to FIG. 2, it will be appreciated that the routine 400 and/or various portions thereof can be performed with other liquid jet cutting systems having motorized or otherwise automatically controlled ADOs configured in accordance with the present disclosure.

Referring to FIGS. 4 and 2 together, the routine 400 begins with the cutting head valve 216*a* in a closed position, and the ADO valve 216*b* in an open position. In decision block 402, the routine determines if the cutting head 202 has a new cutting head orifice 203. For example, in some embodiments determining whether the cutting head 202 has a new orifice 203 can occur manually via input from an operator to the controller 230. If the cutting head orifice 203 is new, then the routine proceeds to block 404 and sets the motorized ADO 220 at a "start" position. For example, in some embodiments, replacing an old cutting head orifice with a new orifice can change the size of the orifice and, if the other system parameters remain unchanged, the operating pressure of the liquid jet cutting system. For this reason, when a new orifice is installed the controller 230 can direct the motor 222 to move the stem 212 as described above to, e.g., a predetermined "start" position (e.g., an initial or starting position for the stem 212 relative to the seat 312). The predetermined "start" position can be a theoretically calculated position that can be determined to set an appropriate pressure for the system based on the size of the replacement orifice. In some embodiments, the motor 222 can include an encoder to facilitate movement of the stem 212 to the "start" position. For example, in some embodiments, the controller 230 can use absolute linear encoder feedback from the motor encoder to set the stem 212 at a desired start position relative to the seat 312. In another embodiment, the controller 230 can execute a "stem homing" routine whereby the operating current limit for the motor 222 is reduced and the motor is operated to drive the stem 212 into the seat 312 to establish a reference or "home" position. Since the operating current limit for the motor 222 is reduced, the motor is shut off before it can apply excess force to the stem 212 which could damage the stem 212 or the seat 312. Once the reference position is established, the controller 230 operates the motor 222 to retract the stem 212 to the "start" position (using, e.g., motor encoder feedback). In some embodiments, the foregoing "stem homing" technique may be preferable over other techniques for moving the stem to 212 to a start position because it can compensate for stem erosion and manufacturing variance in stem length, and can also provide a better in situ method of calibrating the reference position. After setting the motorized ADO 220 at the "start" position, the routine 400 proceeds to block 406 and starts the pump 208 in response to operator input (e.g., in response to the operator tuning the pump 208 "on"). Once the liquid jet cutting system 200 begins operating, the controller 230 can "fine tune" the position of the stem 212 as described below to provide a desired operating pressure based on the pressure feedback from, e.g., the pressure sensor 236.

Returning to decision block 402, if the cutting head orifice has not been replaced, then the routine 400 can proceed directly to block 406 and start the pump 208. In some embodiments, starting the pump 208 can include the operator manually setting the pump to operate at a desired pressure (e.g., a pressure set point) using a suitable user interface. Once the pump 208 begins operating, it drives high-pressure liquid through the motorized ADO 220 via the high-pressure conduit 206 and the open valve **216*b*. In block 408, the controller 230 receives pressure feedback from the pressure sensor 236 which indicates, e.g., the operating pressure of the high-pressure liquid (e.g., water) in the system. As explained above, in other embodiments the controller 230 can receive the pressure feedback from a corresponding sensor at the pump 208, the cutting head 202, and/or another portion of the liquid jet cutting system 200. In decision block 410, based on the pressure feedback, the controller 230 determines if the operating pressure is within a specified range of a target pressure. As used herein, the term "target" pressure can refer to a desired operating pressure of the cutting system, (e.g., 30,000 psi, 40,000 psi, etc.) at a particular time. For example, in some embodiments, the target pressure can be the pressure set point of the pump 208. In other embodiments, such as when the cutting head 202 is transitioning between cuts (and/or the dump valve 221 is open), the target pressure may be less than the pressure set point of the pump 208 (e.g., between about 1,000 to about 6,000 psi less, or about 3,000 to about 5,000 psi less). In some embodiments, the specified range can refer to an acceptable range or preset threshold by which the pressure may vary from the target pressure and not require adjustment of the motorized ADO 220 (e.g., +/−10 psi, +/−100 psi, +/−200 psi, etc.). In other embodiments, the range may be omitted such that the controller 230 controls the setting of the motorized ADO 220** to achieve the target pressure based solely on a comparison of the system pressure to the target pressure.

If the operating pressure is not within a specified range of the target pressure, the routine proceeds to decision block 412 and the controller 230 determines if the operating pressure is greater than the specified range of the target pressure. If so, the routine proceeds to block 412 and the controller 230 sends a command to the motor 222 to automatically adjust the motorized ADO 220 to reduce the system pressure as described above. More specifically, with reference to FIG. 3A, the motor 220 rotates the positioning element 308 by means of the coupling 300 in, e.g., the counterclockwise direction to move the stem 212 outwardly and away from the tapered seat 312 of the dump orifice valve 321. This increases the cross-sectional area of the corresponding valve opening and consequently reduces the pressure of the high-pressure liquid in the cutting system 200. Conversely, if the operating pressure is not greater than the specified range of target pressure (i.e. the operating pressure is less than the specified range), then the routine proceeds from decision block 412 to block 414 and the controller 230 sends a command to the motor 222 to adjust the motorized ADO 220 as necessary to increase the pressure of the high-pressure liquid in the liquid jet cutting system 200. More specifically, again with reference to FIG. 3A, the controller 230 sends a corresponding control signal to the motor 222 causing the motor to rotate the positioning element 308 in, e.g., the clockwise direction to advance the stem 212 inwardly and towards the tapered seat 312. This reduces the cross-sectional area of the dump orifice valve 221 and increases the pressure of the high-pressure liquid in the cutting system 200.

After either block 412 or 414, the routine proceeds to decision block 416 and the controller 230 awaits a signal or instruction (e.g., a software instruction) to start cutting a workpiece, such as the workpiece 218 shown in FIG. 2. If the controller 230 has not received an instruction to start cutting, the routine returns to decision block 410 and proceeds as described above. Conversely, when the controller 230 receives a signal to start cutting, the routine proceeds to block 418 and the controller 230 moves the cutting head valve **216*a* to the "open" position and the ADO valve 216*b* to the "closed" position. This causes high-pressure liquid to flow from the pump 208 and through the cutting head nozzle 204 to cut the workpiece 218, as shown in block 420. In decision block 422, the controller 230 determines if it has received a signal or instruction to stop cutting. If not, the routine returns to block 420 and continues cutting the workpiece. Conversely, if the controller 230 receives a signal to stop cutting, the routine proceeds to decision block 424 and determines whether the stop is a temporary stop or a permanent stop. For example, in decision block 424 the controller 230 can determine if the cutting is stopped temporarily while the cutting head 202 transitions from one cut to another cut on the workpiece 218. Alternatively, the liquid jet cutting system 200 may be finished cutting the workpiece 218, and thus the signal to the controller 230 will be to stop the cutting process in which case the routine proceeds to block 428 and the controller 230 stops operation of the pump 208**.

Conversely, if at decision block 424 the controller 230 determines that the cutting operation has only been temporarily stopped while the cutting head 202 transitions between cuts, then the routine proceeds to block 426 and the controller 230 opens the ADO valve **216*b* while closing the cutting head valve 216*a*. This causes the flow of high-pressure liquid through the nozzle 204 to stop, while at the same time causing the high-pressure liquid to flow out of the liquid jet cutting system 200 via the motorized ADO 220 while the pump 208 continues to operate. In this way, the liquid jet cutting system 200 can maintain the high-pressure liquid at a desired pressure during a change of the cutting state and/or a transition of the cutting operation and avoid undesirable pressure spikes/dips as explained above. Moreover, to ensure that the operating pressure of the cutting system 200 is maintained within a desirable range, the routine can return to block 408 and the controller 230 again receives feedback from the pressure sensor 236 indicating the operating pressure of the cutting system 200. After receiving this input, the controller 230 proceeds through the subsequent steps of the routine as described above to automatically control the motorized ADO 220 and adjust the system operating pressure as necessary to maintain it within a specified range of a desired or "target" pressure. Once the cutting operation has been completed, the routine proceeds to block 428 and stops the pump 208**, and the routine ends.

As described above in reference to FIG. 4, in some embodiments the motorized ADO 220 is used to control the pressure at the pump 208 automatically while the cutting head nozzle 204 of the liquid jet cutting system 200 is closed. In other embodiments, the motorized ADO 220 can be used as an excess flow valve to set and/or control the pressure through the nozzle 204 of the liquid jet cutting system 200 while the nozzle 204 is open and the machine is cutting. For example, in one such embodiment, the ADO valve **216*b* can be set to the "open" position and the motorized ADO 220 can be adjusted during a "machine reset" stage and left at that setting while the cutting system 200 is cutting. In this manner, leaks in the system and/or wear of the cutting orifice 203 can be detected by monitoring the operation of the motor 222 (e.g., the RPM of the motor output shaft 304) by the controller 230 to determine if, e.g., it reaches a value that is above some threshold. By way of example, excessive movement of the motor output shaft 304 to change the setting of the dump orifice valve 221 (e.g., to increase the pressure in the system) can be an indication of leaks and/or wear in the system. In another embodiment, the motorized ADO 220 can set the dump orifice valve 221 at a given position, and then the controller 230 can monitor for leaks and/or orifice wear (e.g., at the cutting head 202, the pump 208, the high pressure conduits, the motorized ADO 220, etc.) by determining if the position and/or variations/movements of the dump orifice valve 221** exceed a preset threshold.

FIG. 4 is a representative flow diagram that depicts a process used in some embodiments of the present technology. The flow diagram may not show all the functions associated with the process, but instead provides an understanding of commands and information exchanged under the system. Those of ordinary skill in the art will recognize that some functions or exchange of commands and information may be repeated, varied, omitted, or supplemented, and other (less important) aspects not shown may be readily implemented. Moreover, each of the steps depicted in FIG. 4 can itself, in some embodiments, include a sequence of operations that need not be described herein. Those of ordinary skill in the art can create source code, microcode, program logic arrays or otherwise implement the disclosed technology based on the flow diagram and the detailed description provided herein.

As those of ordinary skill in the art will appreciate, embodiments of the motorized ADOs described herein can reduce the need for operator involvement and provide a more reliable solution for controlling the pressure at the pump 208 (FIG. 2) by automating the procedure of ADO adjustment during operation through use of a pressure feedback control loop. Rather than having a manual hand crank that is reliant on a human operator for adjustment, embodiments of the invention include a control system which monitors system pressures and uses a motor (e.g. an electric stepper motor) to adjust the outlet cross-sectional area of the ADO (by, e.g., turning a threaded rod to thereby move a valve stem back and forth). In some other embodiments, an electric motor with a rotatable output shaft is used to adjust the position of the stem and thereby control and adjust the outlet cross-sectional area of the ADO. In other embodiments, a linear motor is used for this purpose. It is contemplated that electric, hydraulic, pneumatic, and/or other types of motors and other drive devices can be used to adjust the outlet cross-sectional area of the ADO as described herein.

Other advantages of embodiments of the systems, devices and methods described herein to control liquid jet cutting system pressures include: a reduction or elimination of operating pressure spikes and dips in the system; increased high-pressure component life; a reduction of part quality issues resulting from an incorrect ADO setting; a reduction in the level of user experience, skill, and training required; and/or a reduction of human involvement and a more automated operation.

Another advantage of the systems described herein is that, in some embodiments, the motor does not require an encoder or a similar device to set the ADO in an "initial" or "absolute" position, but instead the controller can use a simple "reset" algorithm to adjust the ADO in response to operating pressure feedback as described above.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. The teachings of the present disclosure provided herein can be applied to other systems, not necessarily the system described above. The elements and acts of the various embodiments described above can be combined to provide further embodiments. All of the patents and applications and other references identified herein, including any that may be listed in accompanying filing papers, are incorporated herein by reference. Aspects of the present disclosure can be modified, if necessary, to employ the systems, functions, and concepts of the various references described above to provide yet further embodiments of the present disclosure.

In general, the terms used in the following claims should not be construed to limit the present disclosure to the specific embodiments disclosed in the specification, unless the above Detailed Description section explicitly defines such terms. Accordingly, the actual scope of the present disclosure encompasses not only the disclosed embodiments, but also all equivalent ways of practicing or implementing the present disclosure.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims. Moreover, although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A liquid jet cutting system, comprising:
- a high-pressure conduit;
- a cutting head having a cutting head nozzle and a cutting head valve operable to control a flow of high-pressure liquid from the high-pressure conduit to the cutting head nozzle;
- an adjustable dump orifice (ADO) including—
  - a motor; and
  - a coupling configured to operably couple the motor to a dump orifice valve, wherein the dump orifice valve is configured to cooperate with a dump orifice connected in fluid communication with the high-pressure conduit, and wherein the motor is operable to move the dump orifice valve in a first direction to increase a pressure of the high-pressure liquid flowing through the dump orifice and in a second direction, opposite to the first direction, to reduce the pressure of the high-pressure liquid flowing through the dump orifice; and
- a controller operably connected to the ADO and the cutting head and configured to automatically adjust the flow of the high-pressure liquid through the cutting head and/or the dump orifice by—
  - causing the motor to set a position of the dump orifice valve in response to a change in at least one of a state or a condition of the dump orifice valve and/or the cutting head nozzle,
  - causing the cutting head valve to open and the dump orifice valve to close when the liquid jet system is cutting, and
  - causing the cutting head valve to close and the dump orifice valve to open when the liquid jet cutting system is not cutting.

2. The liquid jet cutting system of claim 1 wherein the liquid jet cutting system is a water jet cutting system.

3. The liquid jet cutting system of claim 1 wherein the ADO further comprises a valve housing containing the dump orifice valve and the dump orifice, wherein the dump orifice valve is positioned downstream of the dump orifice.

4. The liquid jet cutting system of claim 1 wherein the motor is a stepper motor, a linear motor, or a servo motor.

5. The liquid jet cutting system of claim 1 wherein the ADO further comprises:
- a valve housing containing the dump orifice valve and the dump orifice; and
- a coupling housing containing the coupling, wherein the coupling housing is fixedly attached to the valve housing.

6. The liquid jet cutting system of claim 1 wherein the ADO further comprises:
- a valve housing containing the dump orifice valve and the dump orifice, wherein—
  - the dump orifice valve includes a valve seat and a tapered stem configured to be received in the valve seat,
  - the motor is operable to move the tapered stem toward the valve seat to increase the pressure of the high-pressure liquid flowing through the dump orifice, and
  - the motor is further operable to move the tapered stem away from the valve seat to decrease the pressure of the high-pressure liquid flowing through the dump orifice.

7. The liquid jet cutting system of claim 1 wherein the ADO further comprises:
- a valve positioning element having a first end portion configured to interact with the dump orifice valve and a second end portion operably coupled to the motor via the coupling, wherein—
  - the motor is operable to move the valve positioning element in a first way to thereby move the dump orifice valve in the first direction and increase the pressure of the high-pressure liquid flowing through the dump orifice, and
  - the motor is further operable to move the valve positioning element in a second way, opposite to the first way, to thereby move the dump orifice valve in the second direction and reduce the pressure of the high-pressure liquid flowing through the dump orifice.

8. The liquid jet cutting system of claim 7 wherein the motor includes an output shaft, and wherein the coupling includes means for coupling the output shaft to the valve positioning element.

9. The liquid jet cutting system of claim 1, further comprising a pump configured to provide the high-pressure liquid to the cutting head via the high-pressure conduit, wherein the controller is further configured to:
- monitor an operating pressure of liquid in at least one of the pump, the high-pressure conduit, or the cutting head;

compare the operating pressure to a target pressure; and when the operating pressure differs from the target pressure by more than a preset amount, automatically control the operation of the motor to adjust the flow of the high-pressure liquid through the dump orifice to reduce the difference between the operating pressure and the target pressure to less than the preset amount.

10. An adjustable dump orifice (ADO) for use with a liquid jet cutting system, the liquid jet cutting system including a high-pressure conduit configured to provide high-pressure liquid to a cutting head, the ADO comprising:

a motor that includes an output shaft;

a coupling configured to operably couple the motor to a valve, wherein the valve is configured to cooperate with a dump orifice connected in fluid communication with the high-pressure conduit, and wherein the motor is operable to move the valve in a first direction to increase a pressure of the high-pressure liquid flowing through the dump orifice and in a second direction, opposite to the first direction, to reduce the pressure of the high-pressure liquid flowing through the dump orifice;

a valve positioning element having a first end portion configured to interact with the valve and a second end portion operably coupled to the output shaft of the motor via the coupling, wherein— the output shaft is operable to rotate the valve positioning element in a first direction of rotation to thereby move the valve in the first direction and increase the pressure of the high-pressure liquid flowing through the dump orifice, and the output shaft is further operable to rotate the valve positioning element in a second direction of rotation, opposite to the first direction of rotation, to thereby move the valve in the second direction and reduce the pressure of the high-pressure liquid flowing through the dump orifice; and a controller configured to be operably connected to the liquid jet cutting system and automatically control operation of the motor to adjust a flow of the high-pressure liquid through the dump orifice in response to a change in at least one of a state or a condition of the liquid jet cutting system.

11. The ADO of claim 10 wherein the ADO further comprises:

a first gear mounted to the output shaft; and a second gear mounted to the second end portion of the valve positioning element, wherein the coupling is a sleeve coupling having a plurality of splines on an interior portion thereof, the plurality of splines configured to engage with the first and second gears to thereby operably couple the motor to the valve positioning element.

12. An adjustable dump orifice (ADO) for use with a liquid jet cutting system, the liquid jet cutting system including a high-pressure conduit configured to provide high-pressure liquid to a cutting head, the ADO comprising:

a motor;

a coupling configured to operably couple the motor to a valve, wherein the valve is configured to cooperate with a dump orifice connected in fluid communication with the high-pressure conduit, and wherein the motor is operable to move the valve in a first direction to increase a pressure of the high-pressure liquid flowing through the dump orifice and in a second direction, opposite to the first direction, to reduce the pressure of the high-pressure liquid flowing through the dump orifice;

a valve housing containing the valve and the dump orifice;

a coupling housing containing the coupling;

an adapter having a first end portion fixedly attached to the coupling housing and a second end portion, opposite to the first end portion, fixedly attached to the valve housing;

a valve positioning element at least partially positioned within the adapter, wherein the motor is operable to move the valve positioning element in a first way to thereby move the valve in the first direction and increase the pressure of the high-pressure liquid flowing through the dump orifice, and wherein the motor is further operable to move the valve positioning element in a second way, opposite to the first way, to thereby move the valve in the second direction and reduce the pressure of the high-pressure liquid flowing through the dump orifice; and a controller configured to be operably connected to the liquid jet cutting system and automatically control operation of the motor to adjust a flow of the high-pressure liquid through the dump orifice in response to a change in at least one of a state or a condition of the liquid jet cutting system.

13. The ADO of claim 12 wherein:

the motor includes an output shaft, the adapter includes a threaded bore, the valve positioning element is threadably received in the threaded bore of the adapter, the valve positioning element having a first end portion configured to interact with the valve and a second end portion operably coupled to the output shaft via the coupling, the output shaft is operable to rotate the valve positioning element in a first direction of rotation to thereby move the valve in the first direction and increase the pressure of the high-pressure liquid flowing through the dump orifice, and the output shaft is further operable to rotate the valve positioning element in a second direction of rotation, opposite to the first direction of rotation, to thereby move the valve in the second direction and decrease the pressure of the high-pressure liquid flowing through the dump orifice.

14. The ADO of claim 12 wherein the first way is a first direction of rotation and wherein the second way is a second direction of rotation, opposite the first direction of rotation.

15. A liquid jet cutting system, comprising:

a high-pressure conduit;

a cutting head having a cutting head nozzle and a cutting head valve operable to control a flow of high-pressure liquid from the high-pressure conduit to the cutting head nozzle;

an adjustable dump orifice (ADO)) including— a motor;

a coupling configured to operably couple the motor to a dump orifice valve, wherein the dump orifice valve is configured to cooperate with a dump orifice connected in fluid communication with the high-pressure conduit, and a valve positioning element having a first end portion configured to interact with the dump orifice valve and a second end portion operably coupled to the motor via the coupling; and a controller operably connected to the ADO and the cutting head and configured to automatically adjust the flow of the high-pressure liquid through the cutting head and/or the dump orifice by— causing the motor to move the valve positioning element in a first direction of rotation to move the dome orifice valve in a first direction to increase a pressure of the high-pressure liquid flowing through the dump orifice, causing the motor to move the valve positioning element in a second direction of rotation, opposite the first direction of rotation, to move the dump orifice valve in a second direction, opposite to the first direction, to reduce the pressure of the high-pressure liquid flowing through the dump orifice;

causing the cutting head valve to open and the dump orifice valve to close when the liquid jet cutting system is cutting, and causing the cutting head valve to close and the dump orifice valve to open when the liquid jet cutting system is not cutting.

16. The liquid jet cutting system of claim 15 wherein the motor includes an output shaft, and wherein the coupling includes means for coupling the output shaft to the valve positioning element.

17. The liquid jet cutting system of claim 15 wherein the ADO further comprises:

a valve housing containing the dump orifice valve and the dump orifice;

a coupling housing containing the coupling; and an adapter having a first end portion fixedly attached to the coupling housing and a second end portion, opposite to the first end portion, fixedly attached to the valve housing, wherein the valve positioning element is movably received within the adapter.

18. The liquid jet cutting system of claim 15, further comprising:

a pump configured to provide high-pressure liquid to the cutting head via the high-pressure conduit, wherein the controller is further configured to— monitor an operating pressure of liquid in at least one of the pump, the high-pressure conduit, or the cutting head;

compare the operating pressure to a target pressure; and when the operating pressure differs from the target pressure by more than a preset amount, automatically cause the motor to move the valve positioning element in the first or second direction of rotation to adjust the flow of the high-pressure liquid through the dump orifice and thereby reduce the difference between the operating pressure and the target pressure to less than the preset amount.

19. The liquid jet cutting system of claim 18 wherein the preset amount is a difference from the target pressure of at least 10 psi.

20. The liquid jet cutting system of claim 18 wherein the target pressure is a pressure set point at which the pump is configured to provide the high-pressure liquid to the cutting head.

21. The liquid jet cutting system of claim 18, further comprising a pressure sensor positioned to measure the operating pressure of the liquid in the pump, the high-pressure conduit, and/or the cutting head, wherein the controller is configured to monitor the operating pressure of the liquid via the pressure sensor.

22. The liquid jet cutting system of claim 21 wherein the pressure sensor is operably connected to the high-pressure conduit and configured to monitor the operating pressure of the liquid therein.

23. The liquid jet cutting system of claim 21 wherein the pressure sensor is operably connected to the pump and configured to monitor the operating pressure of the liquid therein.

* * * * *